US008623494B2

(12) United States Patent
Richardson et al.

(10) Patent No.: US 8,623,494 B2
(45) Date of Patent: Jan. 7, 2014

(54) PROTECTIVE CUSHION COVER FOR AN ELECTRONIC DEVICE

(75) Inventors: Curtis R. Richardson, Fort Collins, CO (US); Jamie L. Johnson, Fort Collins, CO (US); Alan V. Morine, Fort Collins, CO (US); Stephen Willes, Fort Collins, CO (US); Matthew M. Glanzer, Loveland, CO (US)

(73) Assignee: Otter Products, LLC, Fort Collins, CO (US)

( * ) Notice: Subject to any disclaimer, the term of this patent is extended or adjusted under 35 U.S.C. 154(b) by 776 days.

(21) Appl. No.: 12/648,549

(22) Filed: Dec. 29, 2009

(65) Prior Publication Data

US 2010/0104814 A1 Apr. 29, 2010

Related U.S. Application Data

(60) Provisional application No. 61/141,097, filed on Dec. 29, 2008.

(51) Int. Cl.
*B32B 3/30* (2006.01)

(52) U.S. Cl.
USPC ........... 428/156; 428/160; 428/161; 428/162; 428/163; 428/167; 428/217; 206/521; 206/591; 206/701

(58) Field of Classification Search
USPC ........... D3/218, 219; D14/440, 444; 150/165; 455/575.8, 575.1, 90.3; 312/223.2; 220/4.02; 361/679.02, 679.03, 679.55, 361/679.56, 679.34; 248/638; 156/87; 206/320, 701, 521, 588, 591; 720/651, 720/688, 692, 718, 719; 428/156, 163, 160, 428/161, 162, 167, 217
See application file for complete search history.

(56) References Cited

U.S. PATENT DOCUMENTS

| | | | |
|---|---|---|---|
| 3,590,988 | A | 7/1971 | Hollar |
| 4,352,968 | A | 10/1982 | Pounds |
| 4,703,161 | A | 10/1987 | McLean |
| 4,762,227 | A | 8/1988 | Patterson |
| 5,092,459 | A | 3/1992 | Uijanic et al. |
| 5,123,044 | A | 6/1992 | Tate |
| 5,175,873 | A | 12/1992 | Goldenberg et al. |
| 2,392,787 | A | 7/1994 | Vermot |
| 5,386,084 | A | 1/1995 | Risko |
| 5,499,713 | A | 3/1996 | Huffer |
| 5,681,122 | A | 10/1997 | Burke |
| D419,297 | S | 1/2000 | Richardson et al. |

(Continued)

OTHER PUBLICATIONS

U.S. Appl. No. 29/344,690, filed Oct. 2, 2009.

(Continued)

*Primary Examiner* — Maria Veronica Ewald
*Assistant Examiner* — Brian Handville

(57) ABSTRACT

Disclosed is a protective cover for an electronic device that is made from an elastomeric material that simultaneously provides cushioning that would otherwise be provided by a softer, thicker material, while utilizing a single, denser material that provides a slim profile and has sufficient density to conform well to the electronic device and prevent the transmission of impacts with hard surfaces directly to the electronic device. Although a denser material is used for the protective cover, recesses are formed in thicker portions at impact points that create compressible ribs. The ribs provide softer, cushioned portions of the cover in the impact areas, which are capable of absorbing the shock and energy of impacts. Other protective covers have a uniform thickness.

16 Claims, 7 Drawing Sheets

(56) References Cited

U.S. PATENT DOCUMENTS

| | | |
|---|---|---|
| D419,767 S | 2/2000 | Richardson et al. |
| D419,768 S | 2/2000 | Richardson et al. |
| 6,031,524 A | 2/2000 | Kunert |
| 6,041,924 A | 3/2000 | Tajima |
| 6,049,813 A | 4/2000 | Danielson et al. |
| 6,068,119 A | 5/2000 | Derr et al. |
| 6,082,535 A | 7/2000 | Mitchell |
| 6,094,785 A | 8/2000 | Montgomery et al. |
| 6,215,474 B1 | 4/2001 | Shah |
| 6,239,968 B1 | 5/2001 | Kim et al. |
| D443,133 S | 6/2001 | Richardson et al. |
| 6,273,252 B1 | 8/2001 | Mitchell |
| 6,301,100 B1 | 10/2001 | Iwata |
| 6,313,892 B2 | 11/2001 | Gleckman |
| 6,317,313 B1 | 11/2001 | Mosgrove et al. |
| 6,388,877 B1 | 5/2002 | Canova, Jr. et al. |
| 6,415,138 B2 | 7/2002 | Sirola et al. |
| 6,445,577 B1 | 9/2002 | Madsen et al. |
| 6,456,487 B1 | 9/2002 | Hetterick et al. |
| 6,471,056 B1 | 10/2002 | Tseng et al. |
| 6,519,141 B2 | 2/2003 | Tseng et al. |
| 6,536,589 B2 | 3/2003 | Chang |
| D472,384 S | 4/2003 | Richardson |
| 6,616,111 B1 | 9/2003 | White |
| 6,617,973 B1 | 9/2003 | Osterman |
| 6,626,362 B1 | 9/2003 | Steiner et al. |
| 6,646,864 B2 | 11/2003 | Richardson et al. |
| 6,659,274 B2 | 12/2003 | Enners |
| 6,665,174 B1 | 12/2003 | Derr et al. |
| 6,701,159 B1 * | 3/2004 | Powell .................. 455/575.8 |
| 6,731,913 B2 | 5/2004 | Humphreys et al. |
| 6,839,430 B2 | 1/2005 | Kwak |
| 6,929,141 B1 | 8/2005 | Minghetti |
| D513,123 S | 12/2005 | Richardson et al. |
| D513,451 S | 1/2006 | Richardson et al. |
| D514,808 S | 2/2006 | Morine et al. |
| 6,995,976 B2 | 2/2006 | Richardson et al. |
| D516,309 S | 3/2006 | Richardson et al. |
| D516,553 S | 3/2006 | Richardson et al. |
| D516,554 S | 3/2006 | Richardson et al. |
| D516,807 S | 3/2006 | Richardson et al. |
| 7,050,841 B1 | 5/2006 | Onda |
| 7,054,441 B2 | 5/2006 | Pletikosa |
| D526,780 S | 8/2006 | Richardson et al. |
| D530,079 S | 10/2006 | Richardson et al. |
| 7,146,701 B2 | 12/2006 | Mahoney et al. |
| 7,158,376 B2 | 1/2007 | Richardson et al. |
| 7,180,735 B2 | 2/2007 | Thomas et al. |
| D542,524 S | 5/2007 | Richardson et al. |
| 7,230,823 B2 | 6/2007 | Richardson et al. |
| 7,236,588 B2 | 6/2007 | Gartrell |
| 7,255,228 B2 | 8/2007 | Kim |
| 7,290,654 B2 | 11/2007 | Hodges |
| D557,264 S | 12/2007 | Richardson et al. |
| D557,897 S | 12/2007 | Richardson et al. |
| 7,312,984 B2 | 12/2007 | Richardson et al. |
| 7,343,184 B2 | 3/2008 | Rostami |
| 7,400,917 B2 | 7/2008 | Wood et al. |
| 7,418,278 B2 | 8/2008 | Eriksson et al. |
| D581,155 S | 11/2008 | Richardson et al. |
| D581,421 S | 11/2008 | Richardson et al. |
| 7,449,650 B2 | 11/2008 | Richardson et al. |
| D587,008 S | 2/2009 | Richardson et al. |
| D589,016 S | 3/2009 | Richardson et al. |
| D593,319 S | 6/2009 | Richardson et al. |
| D593,746 S | 6/2009 | Richardson et al. |
| D597,301 S | 8/2009 | Richardson et al. |
| D600,908 S | 9/2009 | Richardson et al. |
| D601,799 S | 10/2009 | Andre et al. |
| 7,609,512 B2 | 10/2009 | Richardson et al. |
| D603,602 S | 11/2009 | Richardson et al. |
| 7,612,997 B1 | 11/2009 | Diebel et al. |
| D605,850 S | 12/2009 | Richardson et al. |
| 7,663,878 B2 | 2/2010 | Swan et al. |
| 7,663,879 B2 | 2/2010 | Richardson et al. |
| D611,478 S | 3/2010 | Richardson et al. |
| 7,688,580 B2 | 3/2010 | Richardson et al. |
| D613,282 S | 4/2010 | Richardson et al. |
| 2002/0065054 A1 | 5/2002 | Humphreys et al. |
| 2002/0101707 A1 | 8/2002 | Canova et al. |
| 2003/0151890 A1 | 8/2003 | Huang et al. |
| 2005/0139498 A1 * | 6/2005 | Goros ......................... 206/320 |
| 2006/0279924 A1 | 12/2006 | Richardson et al. |
| 2007/0158220 A1 | 7/2007 | Cleereman et al. |
| 2008/0316687 A1 | 12/2008 | Richardson et al. |
| 2009/0009945 A1 | 1/2009 | Richardson et al. |
| 2009/0034169 A1 | 2/2009 | Richardson et al. |
| 2009/0080153 A1 | 3/2009 | Richardson et al. |
| 2009/0111543 A1 | 4/2009 | Tai et al. |
| 2009/0283184 A1 | 11/2009 | Han |
| 2010/0147737 A1 * | 6/2010 | Richardson et al. .......... 206/701 |

OTHER PUBLICATIONS

U.S. Appl. No. 29/344,692, filed Oct. 2, 2009.
U.S. Appl. No. 29/344,693, filed Oct. 2, 2009.
U.S. Appl. No. 29/344,694, filed Oct. 2, 2009.
U.S. Appl. No. 29/344,695, filed Oct. 2, 2009.
U.S. Appl. No. 29/345,058, filed Oct. 8, 2009.
U.S. Appl. No. 29/345,057, filed Oct. 8, 2009.
U.S. Appl. No. 29/345,131, filed Oct. 9, 2009.
U.S. Appl. No. 29/345,177, filed Oct. 9, 2009.
U.S. Appl. No. 29/345,175, filed Oct. 12, 2009.
U.S. Appl. No. 29/345,177, filed Oct. 12, 2009.
U.S. Appl. No. 29/352,146, filed Dec. 17, 2009.
U.S. Appl. No. 61/262,848, filed Nov. 19, 2009.
U.S. Appl. No. 29/352,358, filed Dec. 18, 2009.
U.S. Appl. No. 29/352,359, filed Dec. 18, 2009.
U.S. Appl. No. 29/352,360, filed Dec. 18, 2009.
U.S. Appl. No. 29/352,362, filed Dec. 18, 2009.
U.S. Appl. No. 29/352,365, filed Dec. 18, 2009.
U.S. Appl. No. 29/352,363, filed Dec. 18, 2009.
Non-Final Office Action, mailed Apr. 1, 2010, in U.S. Appl. No. 12/134,120, filed Jun. 5, 2008, by Curtis R. Richardson et al.
U.S. Appl. No. 29/284,532, filed Sep. 10, 2007.
U.S. Appl. No. 29/298,581, filed Dec. 7, 2007.
U.S. Appl. No. 29/284,641, filed Sep. 12, 2007.
U.S. Appl. No. 29/298,580, filed Dec. 7, 2007.
Non-Final Office Action, mailed Mar. 10, 2003, in U.S. Appl. No. 10/300,200, filed Nov. 19, 2002, by Curtis R. Richardson.
Non-Final Office Action, mailed May 6, 2004, in U.S. Appl. No. 10/645,439, filed Aug. 20, 2003, by Curtis R. Richardson.
Non-Final Office Action, mailed Sep. 27, 2004, in U.S. Appl. No. 10/645,439, filed Aug. 20, 2003, by Curtis R. Richardson.
Final Office Action, mailed Jun. 9, 2005, in U.S. Appl. No. 10/645,439, filed Aug. 20, 2003, by Curtis R. Richardson.
Non-Final Office Action, mailed Oct. 19, 2006, in U.S. Appl. No. 11/270,732, filed Nov. 8, 2005, by Curtis R. Richardson.
U.S. Appl. No. 29/321,167, filed Jul. 11, 2008.
U.S. Appl. No. 29/324,499, filed Sep. 12, 2008.
U.S. Appl. No. 12/134,120, filed Jun. 5, 2008.
U.S. Appl. No. 29/326,210, filed Oct. 14, 2008.
Non-Final Office Action, mailed Dec. 5, 2008, in U.S. Appl. No. 11/456,157, filed Jul. 7, 2006, by Curtis R. Eriksson.
Non-Final Office Action, mailed Jun. 26, 2007, in U.S. Appl. No. 11/676,986, filed Feb. 20, 2007, by Curtis R. Richardson.
U.S. Appl. No. 11/466,342, filed Aug. 22, 2006.
U.S. Appl. No. 11/768,761, filed Jun. 26, 2007.
U.S. Appl. No. 12/205,522, filed Sep. 5, 2008.
U.S. Appl. No. 29/246,914, filed May 19, 2006.
U.S. Appl. No. 12/251,161, filed Oct. 14, 2008.
U.S. Appl. No. 29/328,643, filed Nov. 26, 2008.
U.S. Appl. No. 29/328,645, filed Nov. 26, 2008.
U.S. Appl. No. 29/328,647, filed Nov. 26, 2008.
U.S. Appl. No. 12/251,904, filed Oct. 15, 2008.
U.S. Appl. No. 29/328,650, filed Nov. 26, 2008.
U.S. Appl. No. 29/328,959, filed Dec. 4, 2008.
U.S. Appl. No. 61/141,097, filed Dec. 29, 2008.
U.S. Appl. No. 29/338,837, filed Jun. 19, 2009.

(56) References Cited

OTHER PUBLICATIONS

U.S. Appl. No. 29/338,842, filed Jun. 19, 2009.
U.S. Appl. No. 29/338,835, filed Jun. 19, 2009.
U.S. Appl. No. 29/338,909, filed Jun. 19, 2009.
U.S. Appl. No. 29/338,840, filed Jun. 19, 2009.
U.S. Appl. No. 29/339,633, filed Jul. 2, 2009.
U.S. Appl. No. 29/339,634, filed Jul. 2, 2009.
U.S. Appl. No. 29/342,332, filed Aug. 21, 2009.
U.S. Appl. No. 29/342,333, filed Aug. 21, 2009.
U.S. Appl. No. 29/343,127, filed Sep. 8, 2009.
U.S. Appl. No. 29/344,260, filed Sep. 25, 2009.
U.S. Appl. No. 29/344,271, filed Sep. 25, 2009.
U.S. Appl. No. 29/344,276, filed Sep. 25, 2009.
U.S. Appl. No. 29/343,071, filed Sep. 4, 2009.
U.S. Appl. No. 29/341,066, filed Jul. 30, 2009.
U.S. Appl. No. 29/339,632, filed Jul. 2, 2009.
U.S. Appl. No. 29/338,910, filed Jun. 19, 2009.
U.S. Appl. No. 61/236,065, filed Aug. 21, 2009.
U.S. Appl. No. 29/344,583, filed Sep. 30, 2009.
U.S. Appl. No. 61/247,488, filed Sep. 30, 2009.
U.S. Appl. No. 29/346,906, filed Nov. 9, 2009.
U.S. Appl. No. 29/352,364, filed Dec. 18, 2009.

* cited by examiner

US 8,623,494 B2

PROTECTIVE CUSHION COVER FOR AN ELECTRONIC DEVICE

CROSS-REFERENCE TO RELATED APPLICATION

This application claims benefit of and priority to U.S. Provisional Patent Application Ser. No. 61/141,097, entitled "Protective Cushion Cover for an Electronic Device" by Curtis R. Richardson, et al., filed Dec. 29, 2008, the entire contents of which are specifically incorporated herein by reference for all that they disclose and teach.

BACKGROUND OF THE INVENTION

Numerous different types of electronic devices currently exist for communication, entertainment purposes and other purposes. These include various types of computers, including laptop computers, hand-held computers, ultra-mobile computers and tablet computers. In addition, other types of electronic devices include MP3 players that play music, video players, smartphones and other types of communication devices, such as walkie-talkies, navigation devices, such as GPS devices. These devices often include touch screens, interactive panels including, but not limited to, capacitive coupled interfaces, keyboards, scroll wheels, tilt switches, push button switches and other interactive controls. Due to the sensitive nature of these electronic devices, it is desirable to provide protection for these devices.

SUMMARY OF THE INVENTION

An embodiment of the present invention may therefore comprise a protective cover for an electronic device comprising: reduced thickness portions formed from an elastomeric material having a predetermined density and a first predetermined thickness that provides ease of use of the electronic device; raised impact portions having a second predetermined thickness that is greater than the first predetermined thickness, the raised impact portions formed from the elastomeric material; ribs disposed between recesses formed in the raised impact portions, the recesses having a size and spacing that absorbs shocks from impacts.

An embodiment of the present invention may further comprise a method of protecting an electronic device from impacts comprising: providing a protective cover formed from an elastomeric material that has a predetermined density; providing reduced thickness portions of the protective cover that have a first predetermined thickness; providing raised impact portions of the protective cover that have a second predetermined thickness that is greater than the first predetermined thickness; providing recesses in the raised impact portions of the protective cover that allow the protective cover to compress and absorb impacts at the raised impact portions.

An embodiment of the present invention may further comprise a protective cover for a handheld electronic device comprising: an electronic material having a substantially uniform predetermined thickness and a predetermined density that allows the elastomeric material to substantially conform and surround at least a back portion, end portions and side portions of the electronic device; ribs and recesses formed in the elastomeric material that have a size and spacing that substantially absorbs shocks from impact to the protective cover.

An embodiment of the present invention may further comprise a method of protecting a handheld electronic device comprising: providing a protective cushion cover having a predetermined density, a predetermined modulus of elasticity and a predetermined thickness that allow the cushion cover to tightly conform to the handheld electronic device and provide a slim profile for ease of use of the handheld electronic device; forming ribs and recesses in the protective cushion cover that have a size and spacing that substantially absorb impact energy in a manner that is equivalent to thicker, less dense protective cushion covers.

DETAILED DESCRIPTION OF THE EMBODIMENTS

Figure 1:
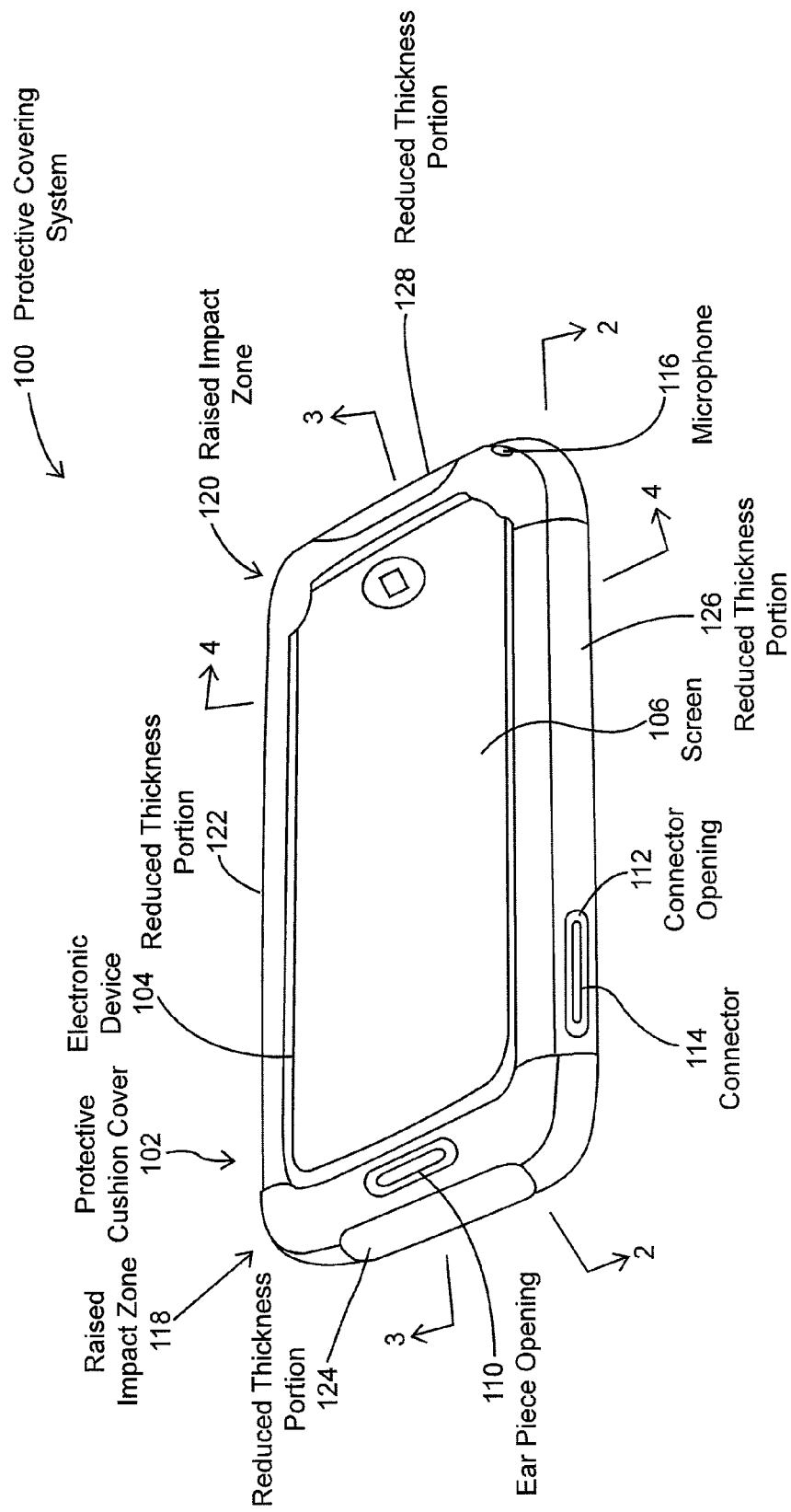
FIG. 1 is a schematic perspective view of an embodiment of a protective covering system for an electronic device.

FIG. 1 is a schematic perspective view of one embodiment of a protective covering system 100 that utilizes a protective cushion cover 102 to provide protection to an electronic device 104. The electronic device 104 can be any type of an electronic device including various types of MP3 players, video players, cell phones, smartphones, satellite phones, walkie-talkies, GPS navigational devices, telematics devices, pagers, monitors, personal data assistants, bar code scanners, as well as various types of computers including portable computers, laptop computers, handheld computers, ultra-mobile computers, tablet computers and various hybrid devices that combine two or more of these functions. In addition, these devices may operate with only a touch screen interface or only a keyboard and display or other type of manual input, and are not limited to devices that include keyboards or buttons as well as a touch screen.

The protective cushion cover 102, illustrated in FIG. 1, wraps around a portion of the outer surface of the electronic device 104. An opening in the protective cushion cover 102 allows the screen 106 of the electronic device 104 to display information. The opening also allows a user to input information into the electronic device 104, if the screen 106 is a touch screen, or through a keypad that is accessible through the opening. The underside of the protective cushion cover 102 substantially covers the back of the electronic device 104. The protective cushion cover 102 additionally has an earpiece opening 110 that provides access to a speaker or earpiece on the electronic device 104, and a connector opening 112, to access a connector 114. The front opening in the protective cushion cover 102 also allows easy access to microphone 116. The protective cushion cover 102 has raised impact zones 118, 120. These raised impact zones 118, 120 provide additional thickness and cushioning to protect the electronic device 104 when electronic device 104 is dropped. As disclosed below, a slim profile for the protective covering system 100 is desirable to allow ease of use of the electronic device 104. In that regard, portions of the protective cushion cover 102 have reduced thickness portions 122, 124, 126, 128 that would not normally contact a surface when dropped, and thicker, raised impact portions 118, 120 around the electronic device 104 that otherwise would contact a surface when dropped. For example, the back portion of the protective cushion cover, as illustrated in FIG. 1, also has a thicker portion which provides adequate protection for the electronic device 104.

The protective cover 102 fits snuggly over the electronic device 104 and is held in place on the electronic device 104 as a result of the pre-shaping of the protective cover 102. The protective cover 102 is made from a soft, pliable material, such as an elastomeric material, that is capable of stretching sufficiently to allow the electronic device 104 to slide easily into and be removed from the protective cover 102. The protective cover 102 has a modulus of elasticity that allows the protective cover 102 to conform closely to the electronic device 104.

In order to achieve the results of providing a protective covering that is thin and conforms well to the electronic device, while having thicker, softer portions in impact areas, such as corners, it would appear that two different types of material would be required. The use of two different types of materials, that are joined together in a layered fashion, would substantially increase the cost of a protective cover because of the increased manufacturing costs resulting from the complexity of the manufacturing processes for forming protective covers that are made from more than one material, in addition to the added cost of using two different materials.

Figure 2:
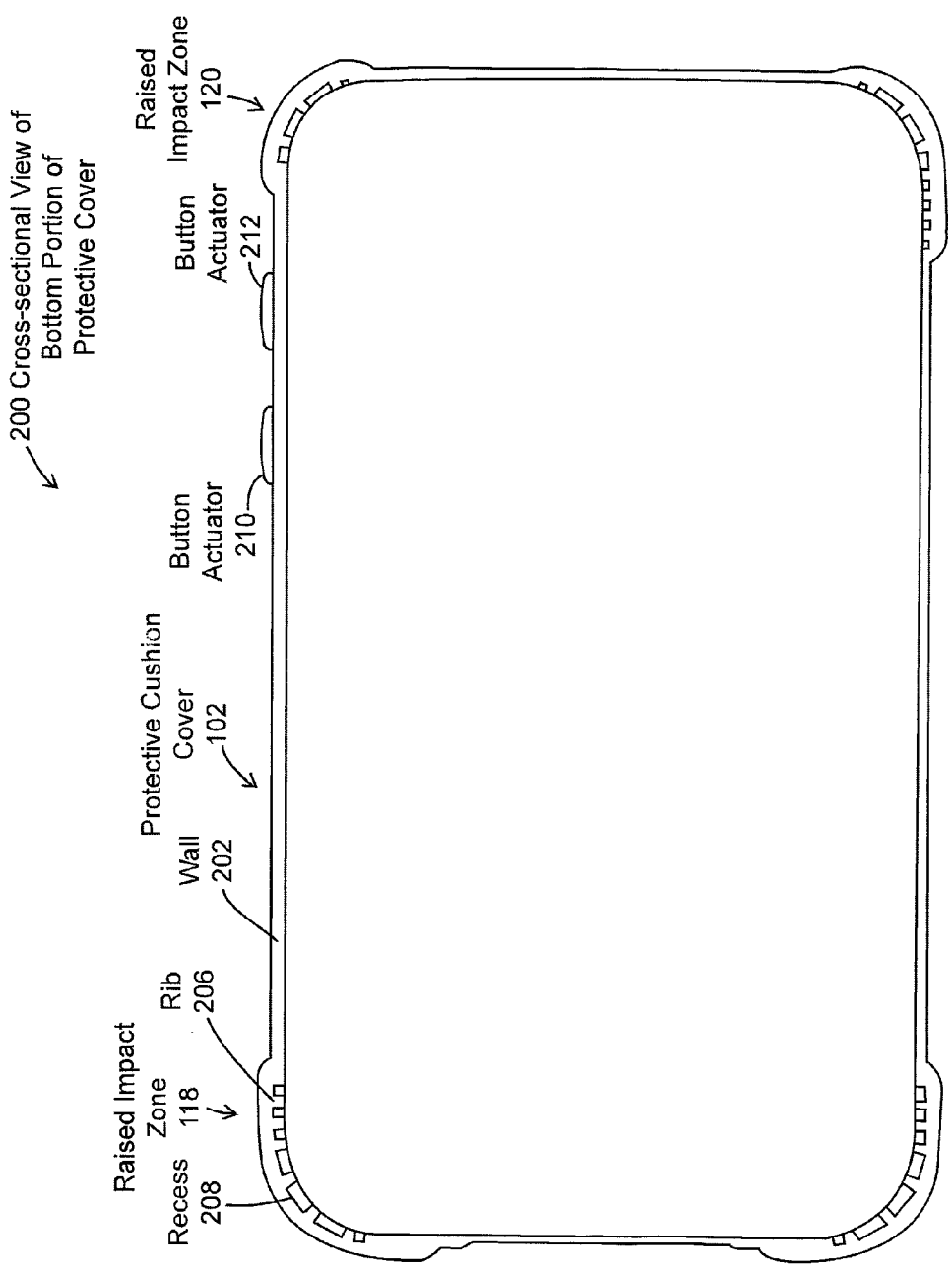
FIG. 2 is a cross-sectional view showing the bottom portion of the embodiment illustrated in FIG. 1.

Alternatively, the embodiments disclosed herein provide the cushioning that would otherwise be provided by a softer, thicker material, while utilizing a single, denser material. FIG. 2 is a cross-sectional view 200 of the bottom portion of the protective cover 102 that is illustrated in FIG. 1. As shown in FIG. 2, the protective cover 102 has a thin wall portion 202 and enlarged corner portions, such as raised impact zone 118. The protective cover 102 is made from a material that has a density and modulus of elasticity that allows the protective cover to conform well to the electronic device 104 (FIG. 1), while also providing thicker, raised portions in impact areas, such as the corners, that simultaneously prevent an impact with a hard surface from being transmitted directly to the electronic device 104, as a result of the cover being compressed in the impact area, as well as being sufficiently soft to absorb and prevent the transfer of energy through the protective cover 102 to the electronic device. In this manner, denser materials can provide protection that is equivalent to the protection provided by thicker, less dense materials to protect against the transfer of an impact directly to the electronic device resulting from compression of the protective cover material. However, thinner, denser materials are more advantageous for a protective cover, since they provide a slimmer profile than thicker, less dense materials that provide equivalent impact protection. However, denser materials more efficiently transfer energy from impacts than softer, less dense materials. In that regard, it would be advantageous to provide a cover that has the advantages of providing a slimmer profile and preventing impacts from being transferred to an enclosed electronic device as a result of compression of the cover, while simultaneously providing the advantages of absorbing impact energy, so that impact energy is not transferred to the electronic device.

The protective cover 102, illustrated in FIG. 1, is stretchable and can be made of a variety of thermoplastic materials, such as synthetic rubber, silicone, urethane or other materials that are capable of stretching sufficiently to allow the electronic device 104 to slide into the front opening of the protective cover 102. The modulus of elasticity of the protective cover is sufficient to allow the protective cover to easily conform to the electronic device 102 and allow the electronic device 102 to snuggly fit within the protective cover 102.

The raised impact zone 118, illustrated in FIG. 2, includes a plurality of recesses, such as recess 208. Between each adjacent recess is a rib 206. Hence, a plurality of recesses and ribs are provided in the raised impact zones 118, 120. The wall 202 and raised impact zones 118, 120 of the protective cover 102 are made from the same elastomeric material. The recesses form the ribs which provide a softer, more flexible area in the corner portions and other impact zones that are capable of absorbing impact shocks. Of course, any portion of the protective cushion cover 102 that needs impact protection can utilize raised impact zones, and the raised impact zones are not limited to being disposed on end or corner portions only. For example, the back and sides of the cover can have raised impact zones, as desired. The ribs provide support for the enlarged corner portions, such as raised impact zones 118, 120, while the recesses and ribs allow the raised impact zones 118, 120 to compact and absorb energy from impacts. In this fashion, the enlarged corner portions, such as raised impact zones 118, 120, are softer, even though the material used for the enlarged corner portions is the same denser material that is used for the wall 202. The recesses, such as recess 208, allow compression of the ribs, such as rib 206, into the recess portions, so as to absorb shock and energy from impacts in the impact zones 118, 120. The size of the ribs, with respect to the size of the recesses, can be varied to vary the amount of compression that occurs so that shocks occurring in drop situations are absorbed. Button actuators 210, 212 are formed in the protective cushion cover 102 that allow a user to transfer force to control buttons on the electronic device 104. The denser material, that is thinner in the wall portion 202, allows for better functionality insofar as controlling the buttons on the electronic device, using the button actuators 210, 212.

Figure 3:
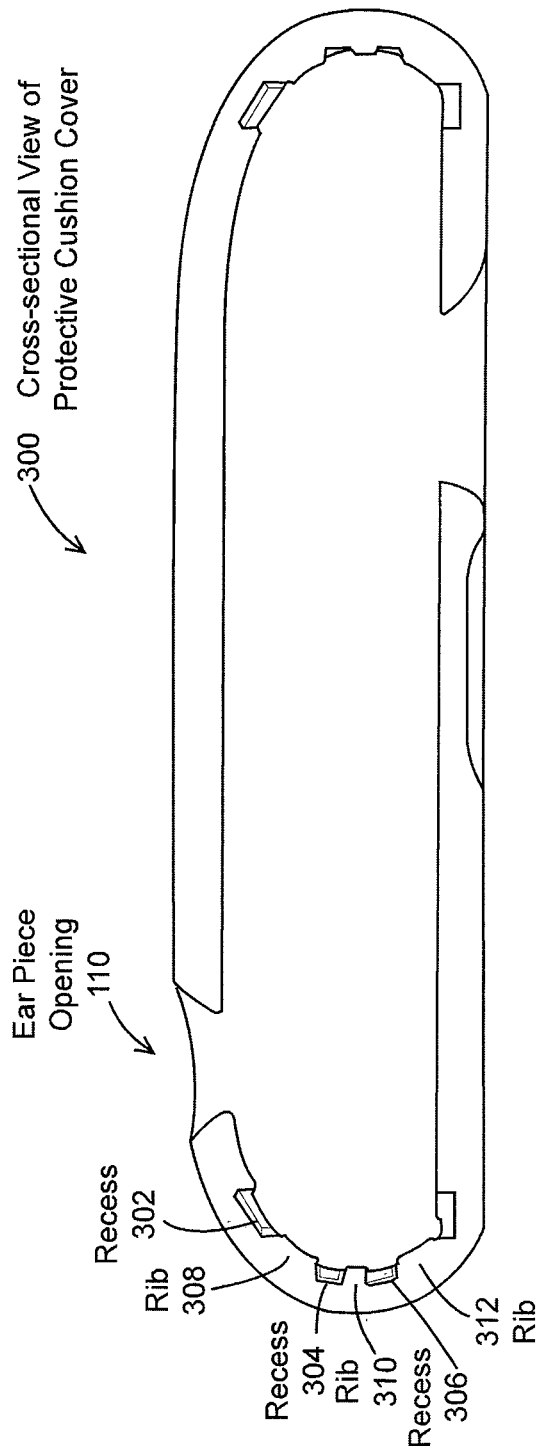
FIG. 3 is a cross-sectional view of the side of the protective cushion cover that is illustrated in FIG. 1.

FIG. 3 is a cross-sectional side view 300 of the protective cushion cover 102. As shown in FIG. 3, a plurality of recesses 302, 304, 306 are formed in one end of the protective cushion cover 102. Ribs 308, 310, 312 are disposed between the recesses. Again, the size and spacing of the recesses 302-306 determine the size and spacing of the ribs 308-312. Formation of the recesses 302-306 softens the impact zones of the protective cushion cover 102 so that the impact zones, that are more likely to impact a hard surface, are softer and absorb impacts with hard surfaces. In this manner, the shock and energy of an impact is absorbed more readily by the protective cushion cover 102. However, the recesses are not made large enough that the protective cover 102 compresses in the area of the impact and causes the impact to be transferred directly to the enclosed electronic device 104. Stated differently, the recesses are sufficiently small to ensure that the impact zones do not compress sufficiently to directly transfer impacts, under standard conditions, such as drop situations, to the electronic device. FIG. 3 also illustrates ear piece opening 110.

Figure 4:
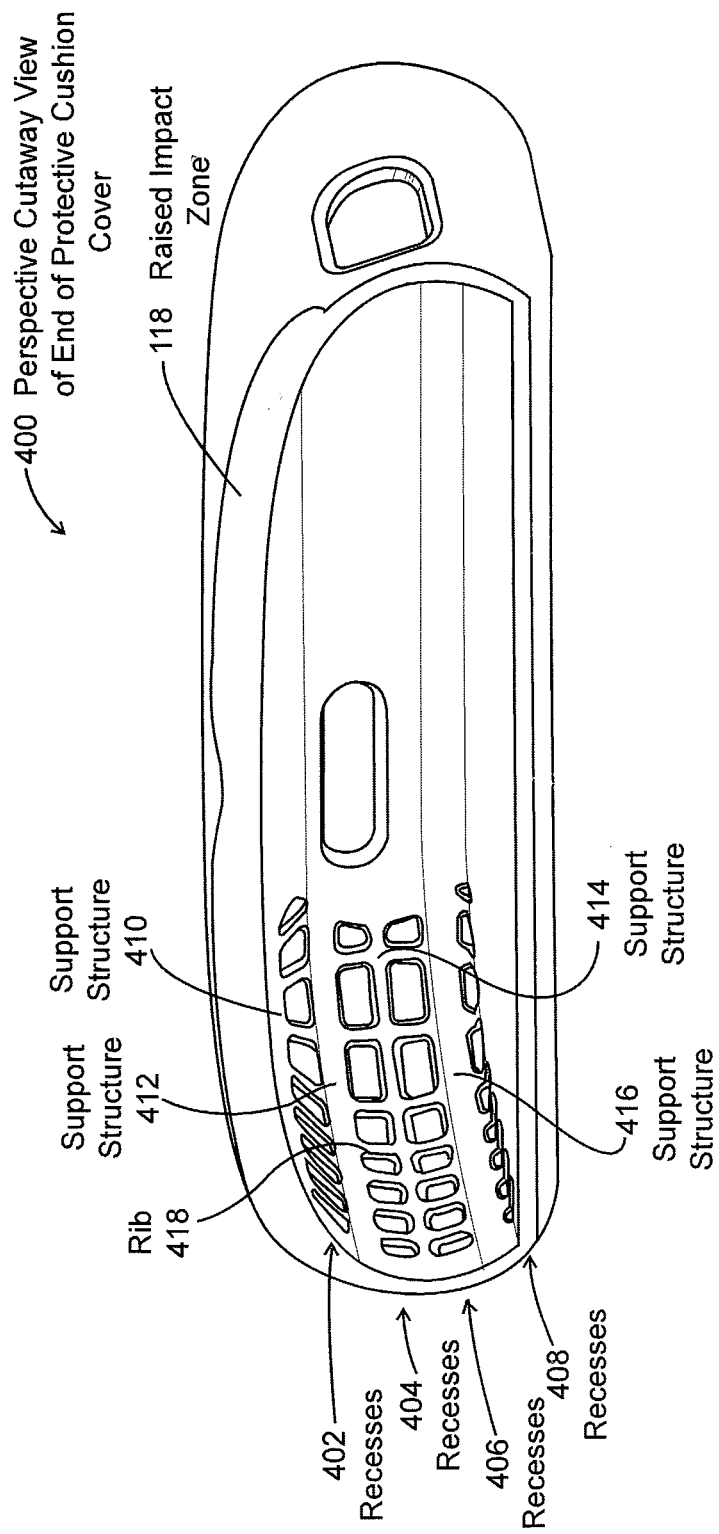
FIG. 4 is a perspective cross-sectional view of an end of the protective cushion cover.

FIG. 4 is a perspective cross-sectional view 400 of an end portion of the protective cushion cover 102. As shown in FIG. 4, there are a plurality of rows of recesses 402, 404, 406, 408 that are formed in the end portion. Support structures 410, 412, 414, 416 are disposed between and adjacent to the rows of recesses 402-408. Ribs, such as rib 418, are disposed between each of the recesses. Recesses 402 is formed in the enlarged end portion 118 along a curved portion that meets with a thinner sidewall. The recesses, for example, may be approximately 5 mm by 4 mm by 1 mm (width, length, height) to 3 mm by 1 mm by 0.5 mm (width, length, height) and may be spaced apart to form ribs that are approximately 1.0 mm to 0.5 mm thickness in one embodiment. For instance, the ribs can have a thickness of approximately 0.7 mm. Other sizes can be used depending upon the density of the material and the cushioning desired. For example, in one embodiment, square recesses are utilized that are approximately 1.5 mm square and have a depth of approximately 1.25 mm. In another embodiment, the recesses can have a width, length, and height of approximately 4 mm, 2 mm, and 0.7 mm, respectively. Recesses 408 are also disposed in a corner where a sidewall meets a bottom portion of the protective cushion cover 102. In one embodiment, the thickness of the protective cover 102 in the raised end portions 118, 120 is approximately 2 mm to 3 mm. The thickness of the protective cover 102 in the reduced thickness portions is approximately 0.5 mm to 0.7 mm, including, for example, 0.6 mm. These are examples only and any desired thickness can be used to provide the desired slim profile while maintaining sufficient protection against impacts by providing ribs and recesses that are capable of absorbing impacts to the protective case under normal use conditions. The density of the elastomeric material is approximately 50-60 Shore A hardness, but may vary from 30 to 70 Shore A hardness. In one embodiment, a range of 48-52 Shore A is used. The recesses 402-408 assist in absorbing impacts along the curved corners of the protective cushion cover 102. All of the recesses 402-408 are disposed in the corner portions and the end portions of the protective cushion cover 102 where impacts are more likely to occur, but can be included in other areas, such as the back.

Hence, the protective cushion cover 102 is capable of providing an additional ability to absorb shocks in areas that are more likely to be impacted by increasing the thickness of the protective cover and providing recesses and ribs between the recesses that soften that area and better absorb impacts. This allows a single material to be used that has a higher density and better conformability to an enclosed electronic device. Thinner walls can be employed in a higher density cover which increases the usability of the protective covering system.

Figure 5:
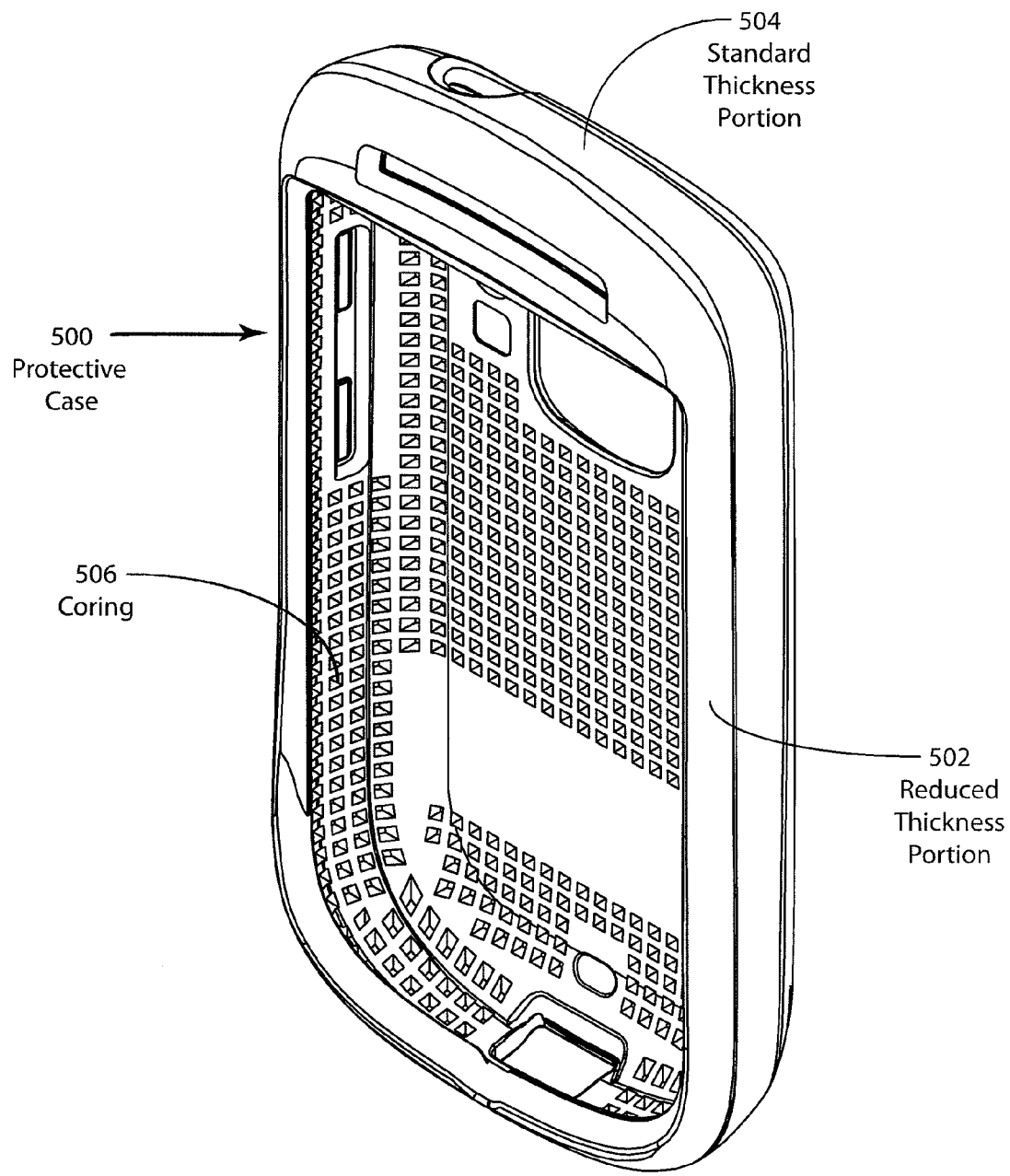
FIG. 5 is a schematic isometric view of another embodiment of a protective cushion cover.

FIG. 5 is a schematic isometric view of another embodiment of a protective cover 500. As shown in FIG. 5, protective cover 500 has a reduced thickness portion 502 and a standard thickness portion 504. The reduced thickness portion 502 is along the upper edge adjacent the opening in the protective cover 500, which allows easy access to the electronic device that is disposed in the protective cover 500. For example, the reduced thickness portion 502 allows the fingers of the user to easily access the electronic device for texting and entering data, such as telephone numbers and other data, into the electronic device. The standard thickness portion 504 extends along the sides and back of the protective cover 500. Coring 506 is disposed in the standard thickness portion 504 and effectively softens and reduces the average density of the standard thickness portion 504, as a result of the ribs and recessed portions that form the coring 506. Coring 506, in one embodiment, is approximately 1.5 mm square and has a depth of approximately 1.25 mm.

Figure 6:
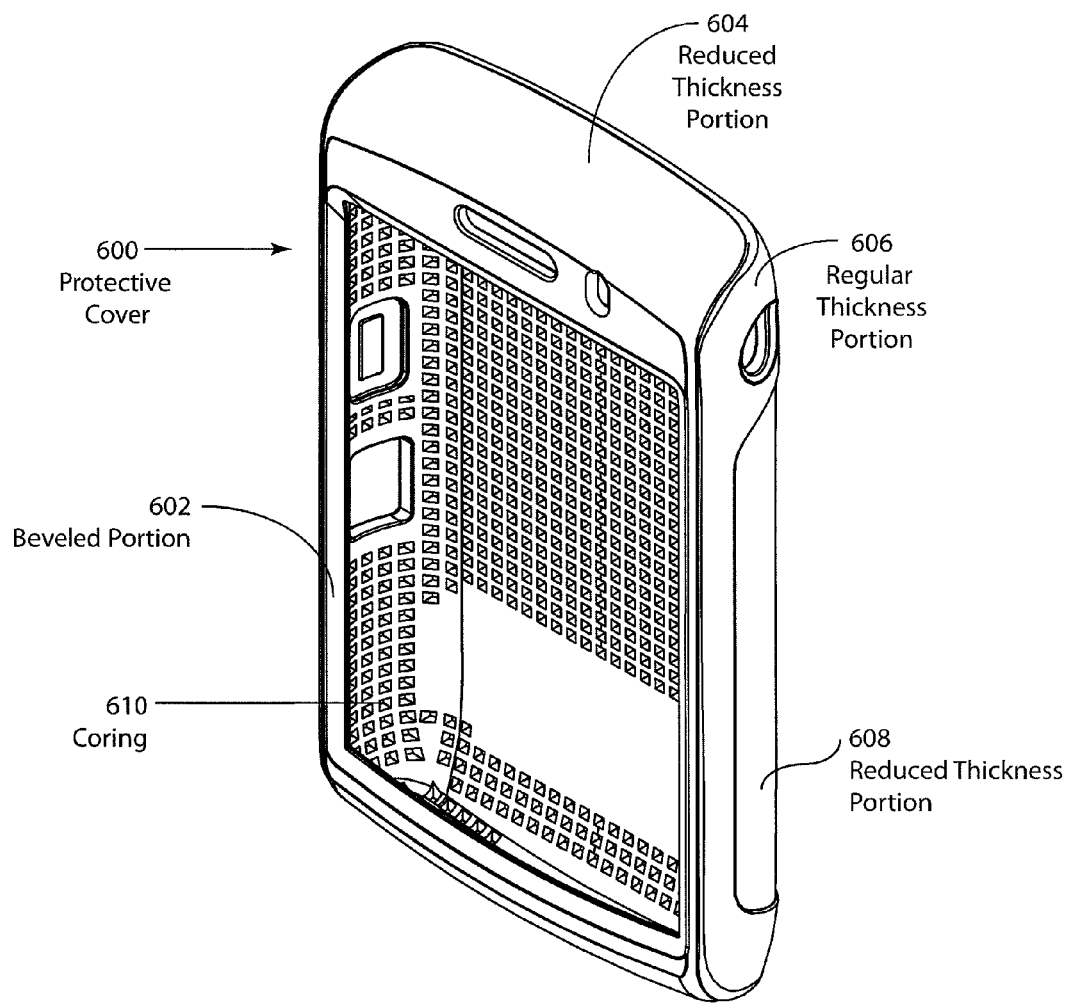
FIG. 6 is a schematic isometric diagram of another embodiment of a protective cushion cover.

FIG. 6 is a schematic isometric diagram of another embodiment of a protective cover 600. As shown in FIG. 6, a beveled portion 602 is adjacent the opening, to allow easy access to the electronic device. A reduced thickness portion 604 and reduced thickness portion 608 are thinner than the regular thickness portion 606. For example, the reduced thickness portion may be approximately 0.5 mm to 0.7 mm, while the regular thickness portion 606 may be approximately 1.5 mm to 2.0 mm. Coring 610 is disposed along various surfaces of the regular thickness portion 606 to provide an average density and softness that is less than the average density and softness of the elastomeric material that forms the protective cover 600.

Figure 7:
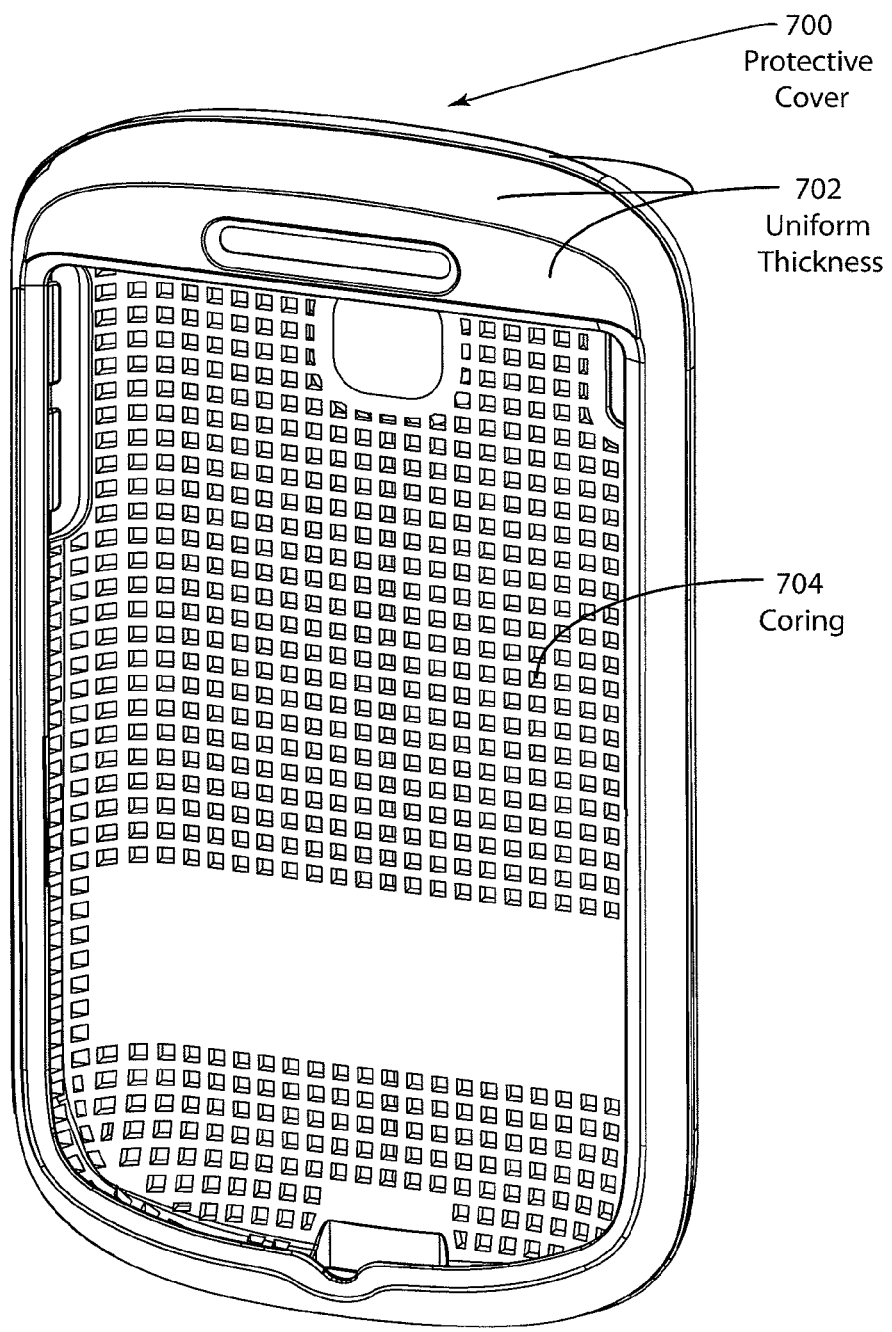
FIG. 7 is a schematic isometric diagram of another embodiment of a protective cushion cover.

FIG. 7 illustrates an embodiment of a protective cover 700. As shown in FIG. 7, the protective cover 700 has a substantially uniform thickness 702 across all of the different portions of the protective cover 700. Coring 704 is disposed along side portions and back portions of the protective cover 700 and functions, as disclosed above, to absorb shocks from impacts and provide an average density that is less than the density of the protective cover 700, which allows the protective cover 700 to be softer in the areas in which the coring 704 exists. The softer portions of the protective cover 700 can more readily absorb shocks from impact than areas without the coring 704. The coring can include a plurality of recesses. For example, the coring (e.g. 506, 610, 704) can include at least 200 recesses or at least 400 recesses, as shown in FIGS. 5-7.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A protective cover for an electronic device comprising:
reduced thickness portions formed from an elastomeric material having a predetermined hardness and a first predetermined thickness that provides ease of use of said electronic device, wherein said elastomeric material is silicone, wherein said predetermined hardness is approximately 50 Shore A;
raised impact portions having a second predetermined thickness that is greater than said first predetermined thickness, said raised impact portions formed from said elastomeric material, wherein said first predetermined thickness is approximately 0.6 mm and said second predetermined thickness is approximately 1.5 mm; and
ribs disposed between recesses formed in said raised impact portions, said recesses having a size and spacing that absorbs shocks from impacts, wherein said recesses have a width, length, and height of approximately 4 mm, 2 mm, and 0.7 mm, respectively, and wherein said ribs have a thickness of approximately 0.7 mm.

2. A method of protecting an electronic device from impacts comprising:
providing a protective cover formed from an elastomeric material that has a predetermined hardness, wherein said predetermined hardness is approximately 50 Shore A, and wherein said elastomeric material is silicone;
providing reduced thickness portions of said protective cover that have a first predetermined thickness;
providing raised impact portions of said protective cover that have a second predetermined thickness that is greater than said first predetermined thickness, wherein said first predetermined thickness is approximately 0.6 mm and said second predetermined thickness is approximately 1.5 mm;
providing recesses in corner portions of said protective cover that allow said protective cover to compress and absorb impacts at said raised impact portions, wherein said recesses have a width, length, and height of approximately 4 mm, 2 mm, and 0.7 mm, respectively; and providing ribs between said recesses, wherein said ribs have a thickness of approximately 0.7 mm.

3. A protective cover for an electronic device, the protective cover comprising:

an elastomeric material having a predetermined hardness that allows the elastomeric material to conform and surround at least a back portion, end portions, and side portions of an electronic device, wherein the predetermined hardness of the elastomeric material is between 30 and 70 Shore A;

a front opening in the elastomeric material that is capable of stretching to allow an electronic device to slide into the protective cover through the front opening; and coring along a back portion of the elastomeric material, the coring formed by a plurality of ribs and a plurality of recesses formed in the elastomeric material, wherein the coring absorbs shocks resulting from impacts to the protective cover, and wherein the plurality of recesses are each approximately a 1.5 mm square and have a depth of approximately 1.25 mm.

4. The protective cover of claim 3, wherein the plurality of recesses are spaced apart to form the plurality of ribs, wherein the plurality of ribs each have a thickness of approximately 0.5 mm to 1.0 mm.

5. The protective cover of claim 3, wherein the plurality of recesses are spaced apart to form the plurality of ribs, wherein the plurality of ribs each have a thickness of approximately 0.7 mm.

6. The protective cover of claim 3, further comprising coring along a side portion of the elastomeric material.

7. The protective cover of claim 3, further comprising coring along an end portion of the elastomeric material.

8. The protective cover of claim 3, further comprising coring along corner portions of the elastomeric material.

9. The protective cover of claim 3, further comprising raised end portions in the elastomeric material, wherein the raised end portions have a thickness of approximately 2 mm to 3 mm, and wherein the raised end portions are disposed proximate corner portions of the protective cover, and wherein the raised end portions comprise coring.

10. The protective cover of claim 3, further comprising a regular thickness portion in the elastomeric material, wherein the regular thickness portion has a thickness of approximately 1.5 mm to 2.0 mm.

11. The protective cover of claim 3, further comprising a reduced thickness portion in the elastomeric material proximate a perimeter of the front opening in the elastomeric material, wherein the reduced thickness portion has a thickness of approximately 0.5 mm to 0.7 mm.

12. The protective cover of claim 3, wherein the elastomeric material comprises synthetic rubber, silicone, or urethane.

13. The protective cover of claim 3, wherein the plurality of recesses comprises at least 200 recesses.

14. The protective cover of claim 3, wherein the plurality of recesses comprises at least 400 recesses.

15. The protective cover of claim 3, wherein the predetermined hardness of the elastomeric material is between 50 and 60 Shore A.

16. The protective cover of claim 3, wherein the predetermined hardness of the elastomeric material is between 48 and 52 Shore A.

* * * * *